United States Patent
Harada

[11] Patent Number: 5,846,164
[45] Date of Patent: Dec. 8, 1998

[54] APPARATUS FOR CONTROLLING NEGATIVE PRESSURE FOR A BRAKE BOOSTER IN A DIESEL ENGINE

[75] Inventor: Jun Harada, Toyota, Japan

[73] Assignee: Toyota Jidosha Kabushiki Kaisha, Toyota, Japan

[21] Appl. No.: 881,151

[22] Filed: Jun. 24, 1997

[30] Foreign Application Priority Data

Sep. 30, 1996 [JP] Japan ..................................... 8-259621
Jan. 23, 1997 [JP] Japan ..................................... 9-010637

[51] Int. Cl.⁶ ............................ B60T 13/52; F02D 41/12
[52] U.S. Cl. ........................ 477/205; 477/206; 303/114.3
[58] Field of Search ................................. 303/141, 139, 303/114.3; 477/203–206

[56] References Cited

FOREIGN PATENT DOCUMENTS

A 58-23244  2/1983  Japan .
A 61-21831  1/1986  Japan .
A 8-164840  6/1996  Japan .

Primary Examiner—Khoi Q. Ta
Attorney, Agent, or Firm—Oliff & Berridge, PLC

[57] ABSTRACT

An improved apparatus for controlling brake force of a vehicle is disclosed. A throttle valve is closed for generating the negative pressure that is supplied to a brake booster. The brake booster is actuated to increase brake force acting on the vehicle when a difference between air pressure and the negative pressure is smaller than a predetermined magnitude. An electric control unit (ECU) actuates the throttle valve to increase the absolute magnitude negative pressure when the ECU determines the differential pressure is smaller than the predetermined magnitude. The ECU corrects the magnitude of the negative pressure with a mapped value based on the computed magnitude.

9 Claims, 9 Drawing Sheets

| tKPBK0-DPBK (mmHg) | 0 | 100 | 200 | 300 | 400 |
|---|---|---|---|---|---|
| a (°) | 1.0 | 1.5 | 2.0 | 2.5 | 3.5 |

| TRTCBK (°) | 0 | 3 | 6 | 9 | 12 |
|---|---|---|---|---|---|
| KAINJ (°CA) | 0 | 2 | 6 | 8 | 10 |

APPARATUS FOR CONTROLLING NEGATIVE PRESSURE FOR A BRAKE BOOSTER IN A DIESEL ENGINE

BACKGROUND OF THE INVENTION

1. Field of the Invention

The present invention relates to apparatuses for controlling negative pressure in internal combustion engines. More particularly, the present invention pertains to apparatuses for controlling negative pressure in internal combustion engines that are provided with brake boosters, which use negative pressure to improve braking force.

2. Description of the Related Art

Brake boosters have become widely used in vehicles to decrease the required pressing force of the brake pedal. A typical brake booster uses negative pressure, which is produced in an intake passage downstream of a throttle valve, as a drive source. In other words, negative pressure is communicated to the brake booster through a communicating pipe connected to the downstream side of the throttle valve. Negative pressure corresponding to the pressed amount of the brake pedal acts on a diaphragm, which is incorporated in the brake booster, and increases the braking force.

However, internal combustion engines such as diesel engines do not control the amount of air intake during operation. Thus, it is difficult to produce negative pressure at the downstream side of the throttle valve. In such cases, vacuum pumps are provided to produce negative pressure for the brake booster.

Japanese Unexamined Patent Publication No. 61-21831 describes an apparatus that produces negative pressure for the brake booster when the vacuum pump malfunctions. The apparatus slightly closes the throttle valve to produce negative pressure at the downstream side of the throttle valve. The negative pressure is communicated to the brake booster.

However, the employment of a vacuum pump increases the engine load and degrades the fuel efficiency.

Furthermore, in engines that perform stratified charge combustion, stoichiometric air-fuel mixture is supplied to the vicinity of an ignition plug in a cylinder. The other portions of the cylinder are provided with only air. Hence, the throttle valve is substantially completely opened during normal running conditions. As a result, practically no negative pressure is produced at the downstream side of the throttle valve. This causes the negative pressure communicated to the brake booster to be insufficient.

SUMMARY OF THE INVENTION

Accordingly, in an engine having a brake booster that uses vacuum pressure to guarantee braking force, it is an objective of the present invention to provide an apparatus for controlling the vacuum pressure that guarantees the necessary vacuum pressure for actuating the brake booster and solves the problems caused by a constant speed throttle valve.

To achieve the foregoing and other objectives and in accordance with the purpose of the present invention, an apparatus for controlling brake force of a vehicle movable based on rotation of an engine is disclosed. The apparatus includes a brake booster. The brake booster increases the brake force in accordance with negative pressure applied thereto The apparatus includes means for generating the negative pressure that is supplied to the brake booster, means for sensing an amount based on the negative pressure supplied to the brake booster, means for determining that an amount of the negative pressure is smaller than a predetermined amount and means for actuating the generating means. The actuating means actuates the generating means to increase the amount of negative pressure when the determining means determines that the negative pressure is smaller than the predetermined amount. The apparatus also includes means for computing the amount of the negative pressure required to operate the brake booster. The computing means compute the required amount of the negative pressure based on a difference between the predetermined amount and the sensed amount. The apparatus further includes means for correcting the amount of he negative pressure increased by the actuating means based on the computed amount.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

One embodiment of an apparatus for controlling negative pressure in an internal combustion engine according to the present invention will now be described with reference to the drawings.

Figure 1:
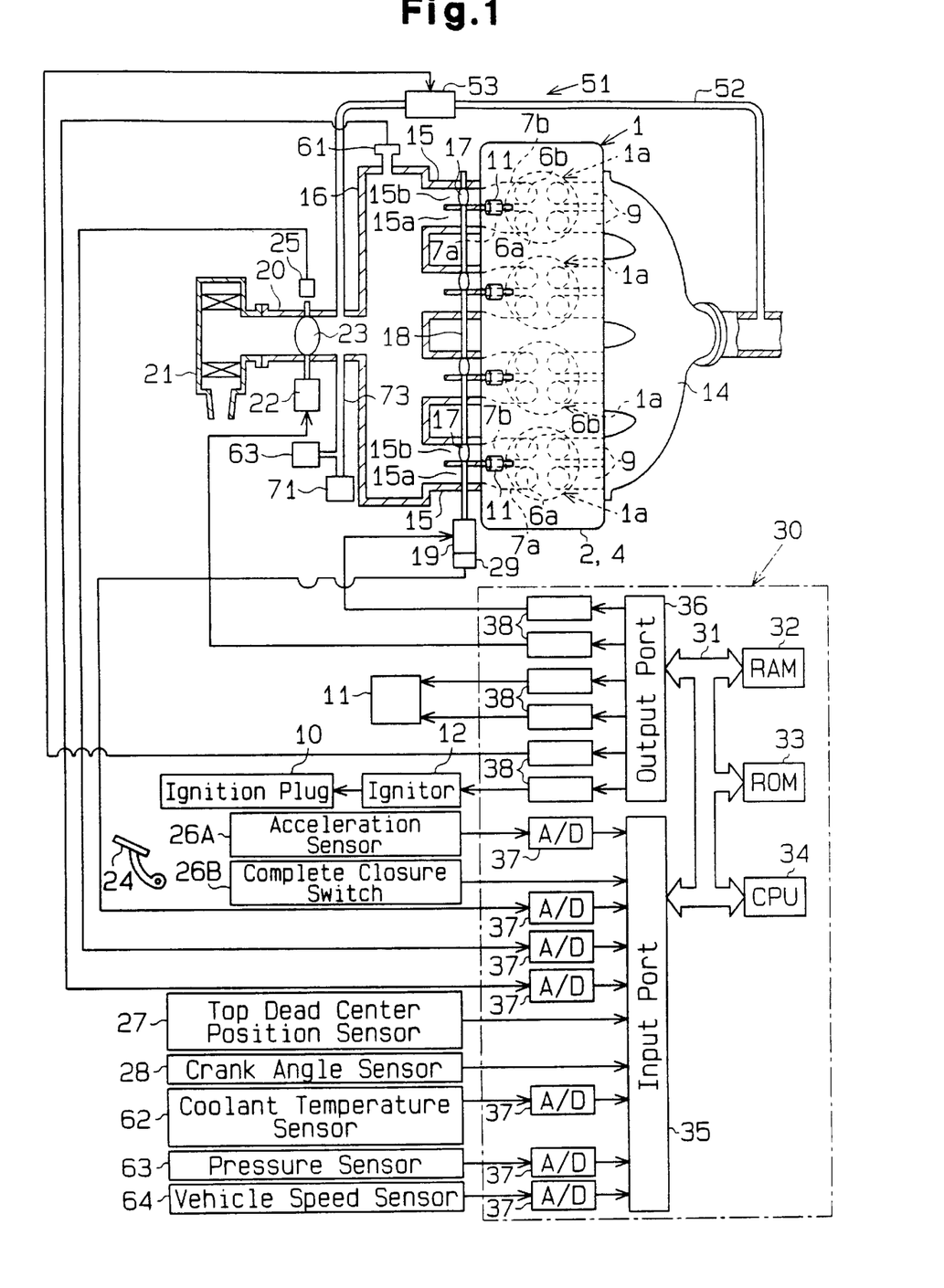
FIG. 1 is a diagrammatic drawing showing an apparatus for controlling negative pressure in an engine according to a first embodiment of the present invention.
Figure 2:
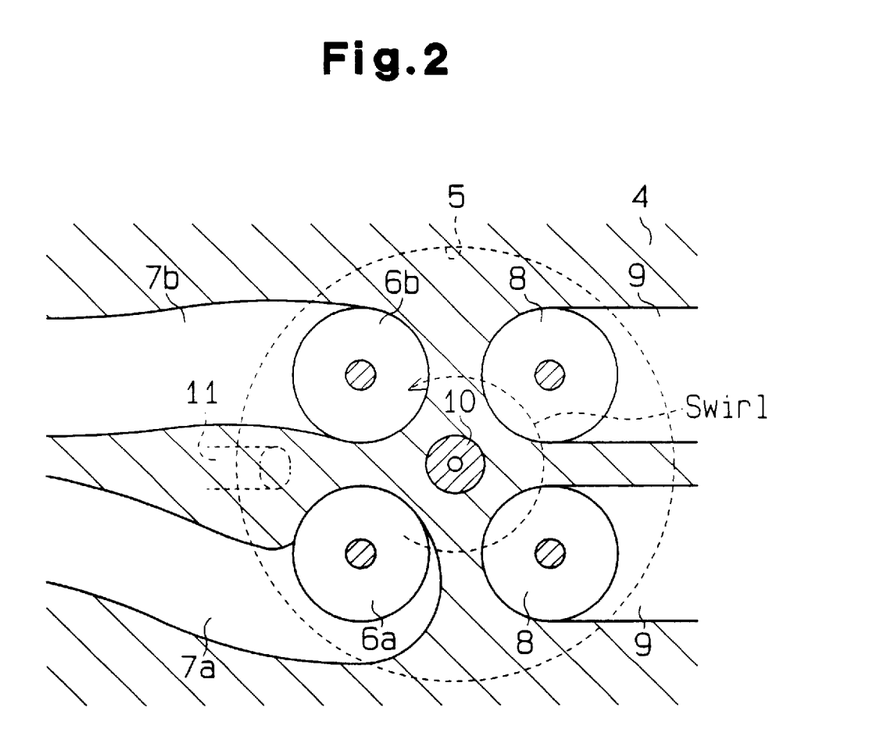
FIG. 2 is an enlarged cross-sectional view showing the cylinder engine.

FIG. 1 is a diagrammatic drawing showing an apparatus for controlling negative pressure in a cylinder injection type engine employed in a vehicle according to a first embodiment of the present invention. An engine 1 is provided with, for example, four cylinders 1a. The structure of the combustion chamber of each cylinder 1a is shown in FIG. 2, As shown in these drawings, the engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4. In this embodiment, four valves (first intake valve 6a, second intake valve 6b, and two exhaust valves 8) are provided for each cylinder 1a. The first intake valve 6a is provided with a first intake port 7a while the second intake valve 6b is provided with a second intake port 7b. Each exhaust valve 8 is provided with an exhaust port 9.

As shown in FIG. 2, the first intake port 7a is a helical port that extends in a helical manner. The second port 7b extends in a straight manner. Ignition plugs 10 are arranged at the middle of the cylinder head 4. High voltage is applied to each ignition plug 10 by an ignitor 12 though a distributor (not shown). The ignition timing of the ignition plugs 10 is determined by the output timing of the high voltage sent from the ignitor 12. A fuel injection valve 11 is arranged near the inner wall of the cylinder head 4 at the vicinity of each set of first and second intake valves 6a, 6b. The fuel injection valve 11 is used to inject fuel directly into the associated cylinder 1a and enables both stratified charge combustion and uniform charge combustion.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve 17 is arranged in each second intake passage 15b The swirl control valves 17 are connected to, for example, a step motor 19 by a common shaft 18. The step motor 19 is controlled by signals sent from an electronic control unit (ECU) 30. The step motor 19 may be replaced by an actuating member controlled by the negative pressure in the intake ports 7a, 7b.

The surge tank 16 is connected to an air cleaner 21 through an intake duct 20. An electrically controlled throttle valve 23, which is opened and closed by a step motor 22 and serves as a negative pressure producing means, is arranged in the intake duct 20. The ECU 30 sends signals to drive the step motor 22 and open and close the throttle valve 23. The throttle valve 23 adjusts the amount of intake air that passes through the intake duct 20 and enters the combustion chambers 5. The throttle valve 23 also adjusts the negative pressure produced in the intake duct 20. In this embodiment, the intake duct 20, the surge tank 16, the first intake passage 15a and the second intake pipe 15b make up an intake passage.

A throttle sensor 25 is arranged in the vicinity of the throttle valve 23 to detect the opening angle (throttle angle TA) of the valve 23. The exhaust ports 9 of each cylinder 1a are connected to an exhaust manifold 14. After combustion, the exhaust gas is sent to an exhaust pipe (not shown) through the exhaust manifold 14.

A conventional exhaust gas recirculation (EGR) mechanism 51 recirculates some of the exhaust gas through an EGR passage 52. An EGR valve 53 is arranged in the EGR passage 52. The EGR passage 52 connects the downstream side of the throttle valve 23 in the intake duct 20 to an exhaust duct. The EGR valve 53 includes a valve seat, a valve body, and a step motor (all of which are not shown). The opening area of the EGR valve 53 is altered by causing the step motor to intermittently displace the valve body with respect to the valve seat. When the EGR valve 53 opens, some of the exhaust gas sent into the exhaust duct enters the EGR passage 52. The gas is then drawn into the intake duct 20 via the EGR valve 53. In other words, some of the exhaust gas is recirculated by the EGR mechanism 51 and returned to the air-fuel mixture. The recirculation amount of the exhaust gas is adjusted by the opening amount of the EGR valve 53.

Figure 3:
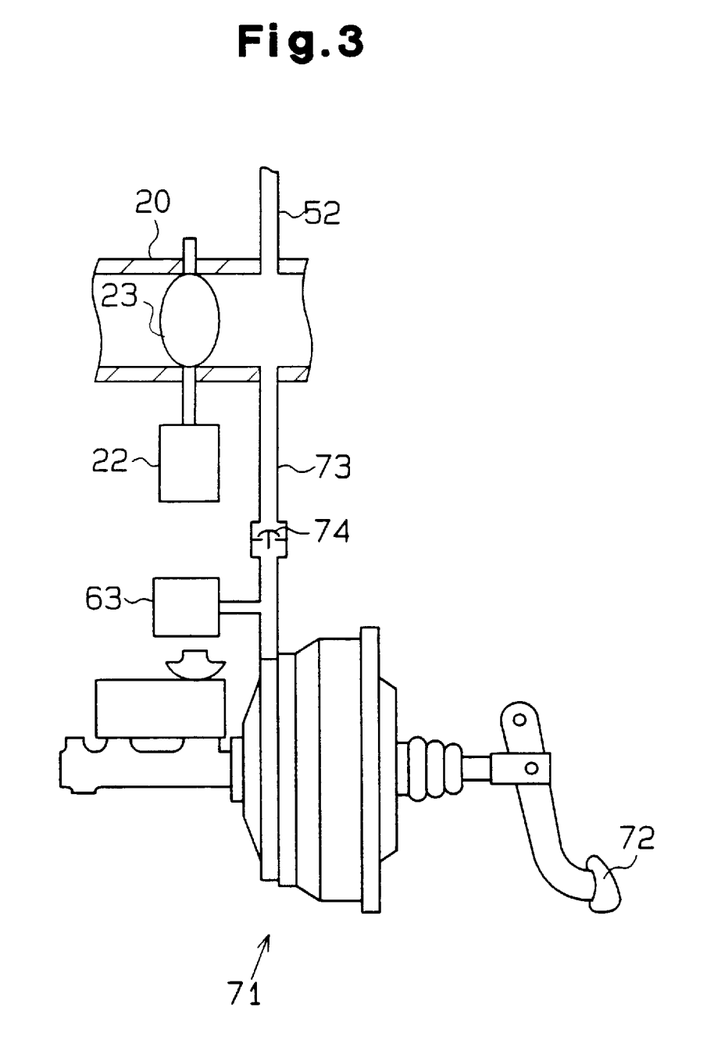
FIG. 3 is a schematic drawing showing the brake booster.

As shown in FIGS. 1 and 3, a brake booster 71 is provided to enhance the braking force of the vehicle. The brake booster 71 increases the pressing force of the brake pedal 72. The pressing force is converted to hydraulic pressure and used to actuate brake actuators (not shown) provided for each wheel. The brake booster 71 is connected to the downstream side of the throttle valve 23 in the intake duct 20 by a connecting pipe 73 and actuated by the negative pressure produced in the duct 20. A check valve 74, which is opened by the negative pressure produced in the intake duct 20, is provided in the connecting pipe 73 (FIG. 3). The brake booster 71 includes a diaphragm, which serves as an actuating portion. One side of the diaphragm communicates with the atmosphere. The negative pressure produced in the intake duct 20 and communicated through the connecting pipe 73 acts on the other side of the diaphragm. A pressure sensor 63 is arranged in the connecting pipe 73 to detect the pressure in the brake booster 71, or the brake booster pressure FBK.

The ECU 30 is a digital computer provided with a random access memory (RAM) 32, a read only memory (ROM) 33, a central processing unit (CPU) 34, which is a microprocessor, an input port 35, and an output port 36. A bidirectional bus 31 connects the RAM 32, the ROM 33, the CPU 34, the input port 35, and the output port 36 to one another.

An acceleration pedal 24 is connected to an acceleration sensor 26A. The acceleration sensor 26A generates voltage proportional to the degree of depression of the acceleration pedal 24. This enables the acceleration pedal depressed amount ACCP to be detected. The voltage output by the acceleration sensor 26A is input into the input port 35 by way of an analog to digital (A/D) converter 37. The acceleration pedal 24 is also provided with a complete closure switch 26B, which detects whether the acceleration pedal 24 is not pressed at all. The closure switch 26B outputs a complete closure signal XIDL set at one when the acceleration pedal 24 is not pressed at all and outputs a complete closure signal XIDL set at zero when the acceleration pedal 24 is pressed. The output voltage of the closure switch 26B is also input into the input port 35.

A top dead center position sensor 27 generates an output pulse when, for example, the piston in the first cylinder 1a reaches the top dead center position. The output pulse is input into the input port 35. A crank angle sensor 28 generates an output pulse each time a crankshaft of the engine 1 is rotated by a crank angle CA of 30 degrees. The output pulse sent from the crank angle sensor 27 is input into the input port 35. The CPU 34 reads the output pulses of the top dead center position sensor 27 and the crank angle sensor 28 to compute the engine speed NE.

The rotational angle of the shaft 18 is detected by a swirl control valve sensor 29 to measure the opening area of the swirl control valves 17. The signal output of the swirl control valve sensor 29 is input into the input port 35 by way of an A/D converter 37.

The throttle sensor 25 detects the throttle angle TA. The signal output of the throttle sensor 25 is input into the input port 35 by way of an A/D converter 37.

An intake pressure sensor 61 is provided to detect the pressure in the surge tank 16 (intake pressure PiM). The intake pressure PiM detected by the intake pressure sensor 61 when the engine 1 is started is substantially equal to the atmospheric pressure PA. Thus, the intake pressure sensor 61 also detects atmospheric pressure.

A coolant temperature sensor 62 is provided to detect the temperature of the engine coolant (coolant temperature THW). A vehicle speed sensor 64 is provided to detect the speed of the vehicle (vehicle speed SPD). The signal outputs of the sensors 61, 62, 64 are input into the input port 35 by way of A/D converters 37. The signal outputs of the pressure sensor 63 are also input into the input port 35 by way of an A/D converter 37.

The running condition of the engine 1 is detected by the throttle sensor 25, the acceleration sensor 26A, the complete closure switch 26B, the top dead center position sensor 27, the crank angle sensor 28, the swirl control valve sensor 29, the intake pressure sensor 61, the coolant temperature sensor 62, the pressure sensor 63, and the vehicle speed sensor 64.

The output port 36 is connected to the fuel injection valves 11, the step motors 19, 22, the ignitor 12, and the EGR valve 53 (step motor) by way of drive circuits 38. The ECU 30 optimally controls the fuel injection valves 11, the step motors 19, 22, the ignitor 12 (ignition plugs 10), and the EGR valve 53 with control programs stored in the ROM 33 based on signals sent from the sensors 25–29, 61–64.

Figure 4:
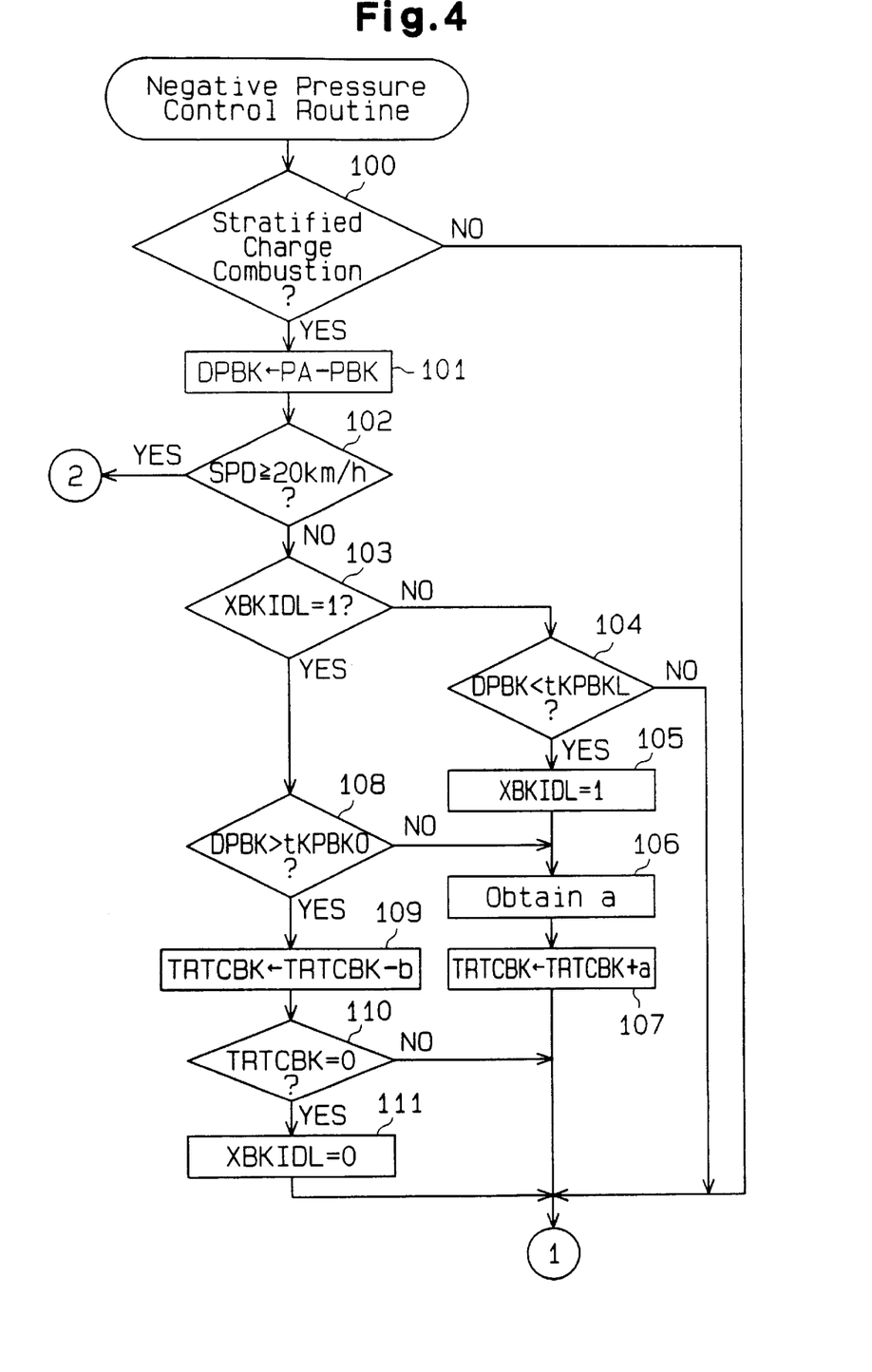
FIG. 4 is a flowchart illustrating the negative pressure control routine executed by the ECU.
Figure 5:
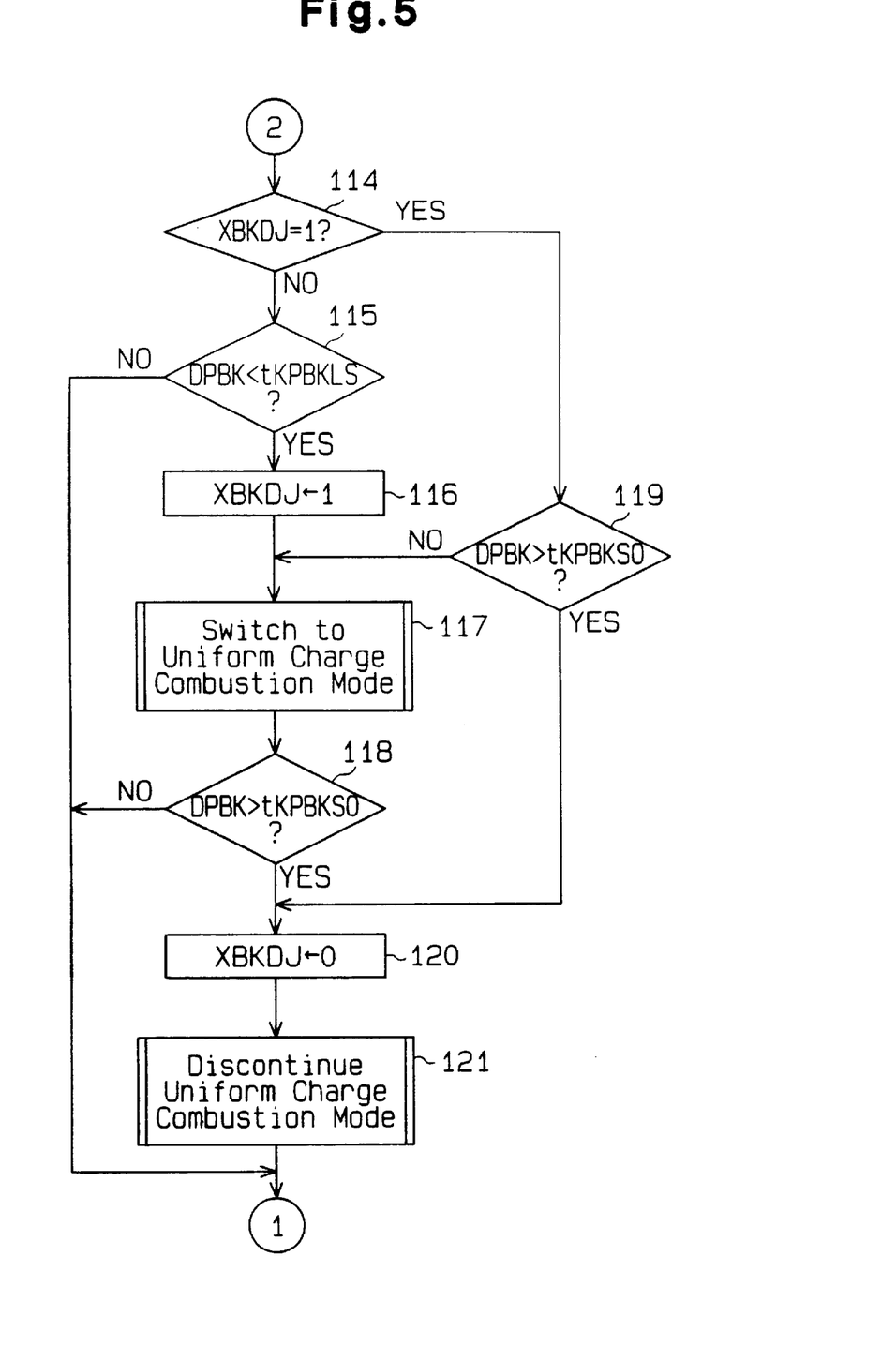
FIG. 5 is a flowchart illustrating the negative pressure control routine that continues from FIG. 4.
Figure 6:
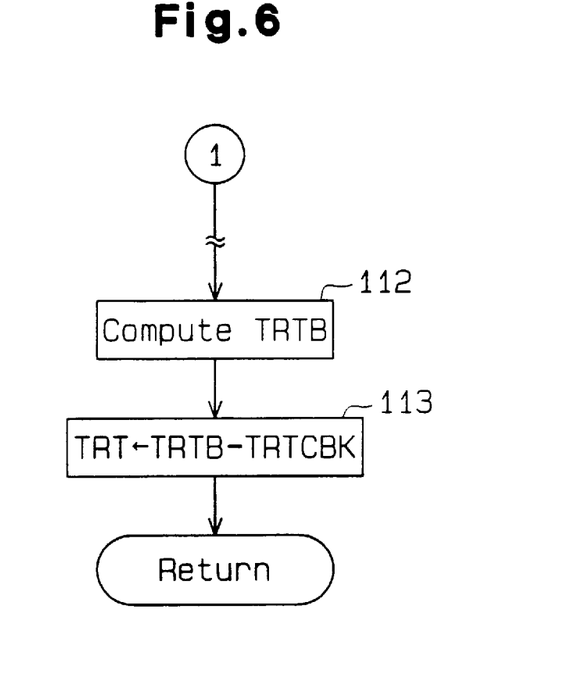
FIG. 6 is a flowchart illustrating the negative pressure control routine that continues from FIGS. 4 and 5.

Control programs stored in the apparatus for controlling negative pressure in the engine 1 will now be described with reference to the flowcharts shown in FIGS. 4–6. A routine executed to control the negative pressure communicated to the brake booster 71 by controlling the throttle valve 23 (the step motor 22) is illustrated in FIGS. 4–6.

When entering the routine, the ECU 30 first determines whether the engine 1 is presently performing stratified charge combustion in step 100. If stratified charge combustion is not being performed, the ECU 30 determines that the engine 1 is presently performing uniform charge combustion. This indicates that problems related with negative pressure are unlikely to occur In this case, the ECU 30 proceeds to step 112.

In step 112, the ECU 30 computes the basic throttle angle TRTB from the present detecting signals (the acceleration pedal depressed amount ACCP, the engine speed NE and other parameters). The ECU 30 refers to a map (not shown) to compute the basic throttle angle TRTB.

The ECU 30 proceeds to step 113 and sets the final target throttle angle, or throttle opening area TRT, by subtracting the present throttle closing angle TRTCBK from the basic throttle angle TRTB. The ECU 30 then temporarily terminates subsequent processing. When the ECU 30 jumps from step 100 to step 112, the value of the throttle closing angle TRTCBK is set at zero. Thus, the basic throttle angle TRTB is set equal to the final target throttle opening area TRT.

In step 100, if it is determined that the engine 1 is performing stratified charge combustion, the ECU 30 proceeds to step 101. At step 101, the ECU 30 subtracts the most recent brake booster pressure PBK, which is detected by the pressure sensor 63, from the atmospheric pressure PA to obtain the pressure difference DPBK.

In step 102, the ECU 30 determines whether the present vehicle speed SPD is equal to or higher than a predetermined speed (e.g., 20 km/h). If the vehicle speed SPD is lower than the predetermined speed, the ECU 30 continues the stratified charge combustion mode and proceeds to step 103 to execute the throttle angle control (stratified charge brake control)

In step 103, the ECU 30 determines whether the flag XBKIDL that indicates the execution of the stratified charge brake control is set at one. The execution flag XBKIDL is set at one when producing negative pressure while performing the stratified charge combustion mode. If the execution flag XBKIDL is set at zero, that is, if the stratified charge control is not in process, the ECU 30 proceeds to step 104.

In step 104, the ECU 30 determines whether the present pressure difference DPBK is smaller than a predetermined negative pressure value tKPBLK (e.g., 300 mmHg), which initiates the stratified charge brake control. If the pressure difference DPBK is smaller than the negative pressure value tKPBLK, the ECU 30 proceeds to step 105.

Figure 7:
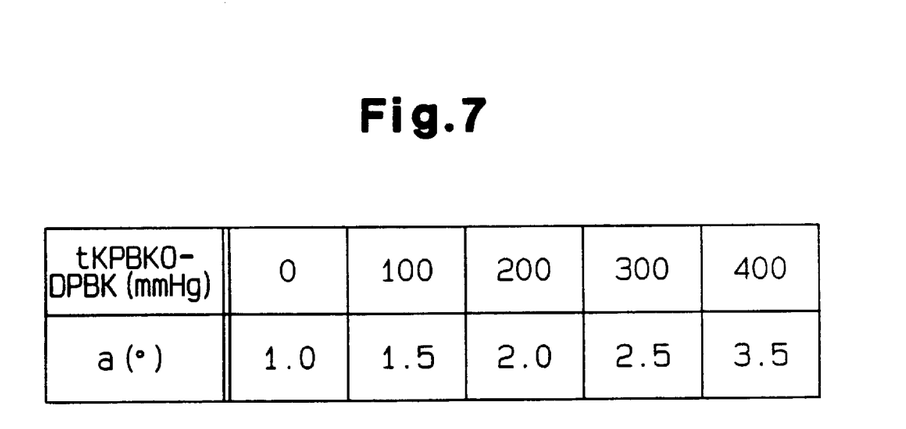
FIG. 7 is a table (map) showing the relationship between the closing compensation angle and the value obtained by subtracting the brake booster pressure value from the negative pressure value when terminating stratified charge brake control.

In step 105, the ECU 30 sets the execution flag XBKIDL to one to enter the stratified charge brake control mode. The ECU 30 then proceeds to step 106 and computes the closing compensation angle a. To obtain the closing compensation value a, the ECU 30 refers to a map such as that shown in FIG. 7. In the map, the closing compensation angles a are indicated in correspondence with values that are obtained by subtracting the value of the pressure difference DPBK from the target negative pressure value tKPBKO (e.g., 350 mmHg). If the pressure difference DPBK is much smaller than the predetermined negative pressure value tKPBKO (i.e., if the subtracted value is large), the closing compensation angle a is set at a large value to increase the closing speed of the throttle valve 23. On the contrary, the closing compensation angle a is set at a small value to decrease the closing speed of the throttle valve 23 when the pressure difference DPBK approaches the predetermined negative pressure value tKPBKO (i.e., when the subtracted value is small).

In step 107, the ECU 30 renews the throttle closing angle TRTCBK to a value obtained by adding the present closing angle compensation value a to the throttle closing angle TRTCBK of the previous cycle and then proceeds to step 112. In step 112, the ECU 30 computes the basic throttle angle TRTB. Then, in step 113, the ECU 30 sets the final target throttle opening area TRT by subtracting the present throttle closing angle TRTCBK from the basic throttle angle TRTB. Afterward, the ECU 30 temporarily terminates subsequent processing. Accordingly, if the ECU 30 carries out steps 103 to 107, the increasing value obtained by subtracting the throttle closing angle TRTCBK is set as the final target throttle opening area TRT.

In step 104, if the pressure difference DPBK is equal to or greater than the negative pressure value tKPBLK that initiates the stratified charge brake control, the ECU 30 jumps to step 112. In this case, stratified charge brake control is not executed.

If the execution flag XBKIDL is set at one in step 103, the ECU 30 proceeds to step 108 and determines whether the pressure difference DPBK exceeds the negative pressure value tKPBKO that terminates the stratified charge brake control. If it is determined that the pressure difference DPBK does not exceed the negative pressure value tKPBKO, the ECU 30 proceeds to step 106. The ECU 30 carries out steps 106, 107 and then proceeds to step 112 to compute the basic throttle angle TRTB.. Subsequently, in step 113, the ECU 30 sets the final target throttle opening area TRT to a value obtained by subtracting the present throttle closing angle TRTCBK from the basic throttle angle TRTB. Afterward, the ECU 30 temporarily terminates subsequent processing. Accordingly, in this case, the value obtained by subtracting the presently increasing throttle closing angle TRTCBK is set as the final target throttle opening area TRT.

If it is determined that the pressure difference DPBK exceeds the negative pressure value tKPBKO in step 108, the ECU 30 proceeds to step 109 to decrease the throttle closing angle TRTCBK (and increase the target throttle opening area TRT). At step 109, the ECU 30 renews the throttle closing angle TRTCBK to a value obtained by subtracting a predetermined closing angle compensation value b (b is a constant value) from the throttle closing angle TRTCBK of the previous cycle.

In step 110, the ECU 30 determines whether the throttle closing angle TRTCBK corresponds to a value of zero. If it is determined that the throttle closing angle TRTCBK does not correspond to a value of zero, the ECU 30 proceeds to step 112 to compute the basic throttle angle TRTB. Subsequently, in step 113, the ECU 30 sets the final target throttle opening area TRT to a value obtained by subtracting the present throttle closing angle TRTCBK from the basic throttle angle TRTB. Afterward, the ECU 30 temporarily terminates subsequent processing. Accordingly, in this case, the value obtained by subtracting the presently decreasing value of the difference between the throttle closing angle TRTCBK and the basic throttle angle TRTB is set as the final target throttle opening area TRT.

If the throttle closing angle TRTCBK corresponds to a value of zero in step 110, the ECU 30 proceeds to step 111. At step 111, the ECU 30 sets the execution flag XBKIDL to zero to terminate the stratified charge brake control mode. The ECU 30 then carries out steps 112, 113 and temporarily terminates subsequent processing. When the ECU 30 proceeds from step 111 to step 112, the value of the throttle closing angle TRTCBK is set at zero. Thus, the final target throttle opening area TRT is set equal to the basic throttle angle TRTB.

In step 102, if the present vehicle speed SPD is equal to or higher than the predetermined speed, the ECU 30 proceeds to step 114 to temporarily perform uniform charge combustion while executing throttle angle control (uniform charge combustion brake control).

In step 114, the ECU 30 determines whether the flag XBKDJ that indicates execution of the uniform charge combustion brake control is set at one. The execution flag XBKDJ is set at one when negative pressure is guaranteed by the performance of the uniform charge combustion. If it is determined that the execution flag XBKDJ is not set at one but set at zero, the ECU 30 proceeds to step 115.

In step 115, the ECU 30 determines whether the present pressure difference DPBK is smaller than the negative pressure value tKPBKLS at which the uniform charge brake control is initiated (e.g., 300 mmHg). If determined that the pressure difference DPBE is equal to or greater than the negative pressure value tKPBKLS, the ECU 30 jumps to step 112. In this case, the uniform charge combustion brake control is not carried out.

If the pressure difference DPBK is smaller than the negative pressure value tKPBKLS, the ECU 30 determines that negative pressure is insufficient and proceeds to step 116. At step 116, the ECU 30 sets the execution flag XBKDJ at one to execute uniform charge combustion control. The ECU 30 then proceeds to step 117 and temporarily switches to the uniform charge combustion mode. During stratified charge combustion, either the stratified charge combustion mode or the uniform charge combustion mode is performed. The stratified charge combustion control is usually performed. However, uniform charge combustion control is performed when necessary. In this mode, the throttle valve 23 is opened and closed in accordance with the load applied to the engine 1 by supplying the necessary amount of air-fuel mixture to produce the power required by the engine 1.

In step 118, the ECU 30 determines whether the present pressure difference DPBK is greater than the negative pressure value tKPBKSO at which the uniform charge combustion brake control is terminated (e.g., 350 mmHg). In most cases, the pressure difference DPBK is still equal to or smaller than the negative pressure value tKPBKSO. In such cases, the ECU 30 proceeds to steps 112, 113. This causes the engine 1 to completely enter uniform charge combustion. Thus, the throttle valve 23 is closed to communicate negative pressure to the brake booster 71.

In step 114, if the execution flag XBKDJ is set at one indicating execution of uniform charge brake control (and indicating that uniform charge combustion is in progress), the ECU 30 proceeds to step 119. At step 119, the ECU 30 determines whether the present pressure difference DPBK is greater than the negative pressure value tKPBKSO at which the uniform charge combustion brake control is terminated (e.g., 350 mmHg). If the pressure difference DPBK is still not greater than the negative pressure, the ECU 30 repeats steps 117, 112, 113 and continues uniform charge combustion.

When sufficient negative pressure is communicated to the brake booster 71 as a result of the uniform charge combustion mode causes the pressure difference DPBK to become greater than the negative pressure value tKPBKSO, at which the uniform charge brake control is terminated, the ECU 30 proceeds to step 120. The ECU 30 proceeds to step 120 from either step 119 or step 111 (in most cases from step 119). At step 120, the ECU 30 determines that there is no need to further produce negative pressure and sets the execution flag XBKDJ to zero. In step 121, the ECU 30 discontinues the uniform charge combustion mode and enters the stratified charge combustion mode. The ECU 30 then carries out steps 112, 113 and terminates subsequent processing.

In the negative pressure control routine, the pressure difference DPBK is computed from the atmospheric pressure PA and the brake booster pressure PBK. The closing control of the throttle valve 23 (negative pressure guaranteeing control) is executed when the pressure difference DPBK is smaller than the negative pressure value tKPBKL, which initiates stratified charge brake control, or smaller than the negative pressure value tKPBKLS, which initiates uniform charge combustion control. If the vehicle speed SPD is lower than the predetermined speed, a negative pressure that guarantees control for stratified charge combustion is provided. At this time, the ECU 30 computes the closing compensation angle a. To obtain the closing compensation value a, the ECU 30 refers to the map shown in FIG. 7. In the map, the closing compensation angles a are indicated in correspondence with values that are obtained by subtracting the value of the pressure difference DPBK from the target negative pressure value tKPBKO. The ECU 30 adds the present closing angle compensation value a to the throttle closing angle TRTCBK of the previous cycle. If the subtracted value is large, the closing compensation angle a is set at a large value to increase the closing speed of the throttle valve 23. On the contrary, the closing compensation angle a is set at a small value to decrease the closing speed of the throttle valve 23 when the subtracted value is small.

If the vehicle speed SPD is equal to or higher than the predetermined speed, a negative pressure guaranteeing control for uniform charge combustion is provided.

In addition, it is determined whether the negative pressure that actuates the brake booster 71 is sufficient (steps 104, 115, etc.). When it is determined that the negative pressure is insufficient, the angle closing control of the throttle valve 23 is carried out. The closing of the throttle valve 23 increases the negative pressure (reduces the pressure) and guarantees the operation of the brake booster 71.

To determine whether it is necessary to produce negative pressure for the actuation of the brake booster 71, the difference between the atmospheric pressure PA and the brake booster pressure PBK, which is detected by the pressure sensor 63, is computed to obtain the pressure difference DPBK. If the pressure difference DPBK is smaller than either the negative pressure value tKPBKL, at which stratified charge brake control is initiated, or the negative pressure value tKPBKLS, at which the uniform charge brake control is initiated, the closing control of the throttle valve 23 (negative pressure ensuring control) is carried out.

Figure 10:
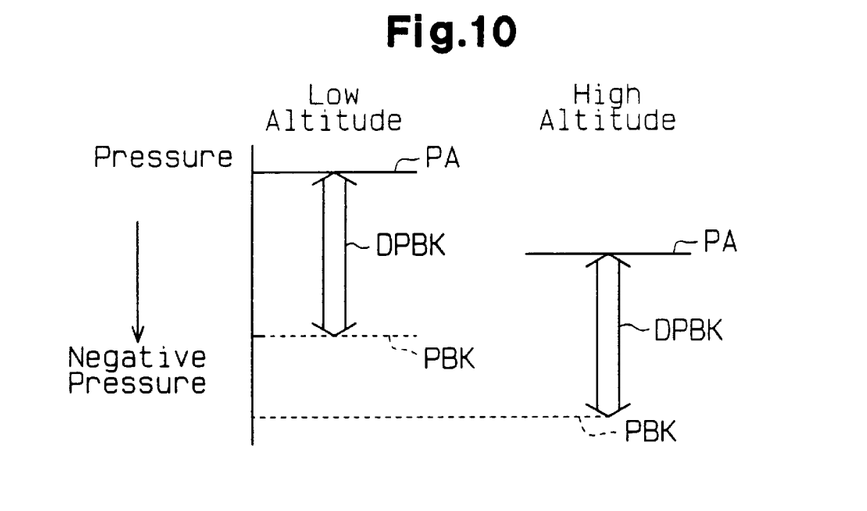
FIG. 10 is a graph illustrating the relationship of the brake booster pressure at low and high altitudes.

Thus, as shown in FIG. 10, when traveling at a high altitude, the decrease in the atmospheric pressure PA causes the brake booster pressure PBK to be lower than when traveling at a low altitude. Accordingly, the brake booster pressure PBK may be low while the actual negative pressure for actuating the brake booster 71 is insufficient. However, in this embodiment, the closing control of the throttle valve 23 is executed to produce negative pressure when the pressure difference DPBK, and not the brake booster pressure PBK, is smaller than the reference value (negative pressure value tKPBKL for initiating stratified charge brake control or the negative pressure value tKPBKLS for initiating uniform charge brake control). This always guarantees sufficient negative pressure for the actuation of the brake booster 71 even when the atmospheric pressure PA fluctuates such as when traveling at high altitudes.

Furthermore, the closing control of the throttle valve 23 is executed if the pressure difference DPBK is smaller than the reference value (negative pressure value tKPBKL for initiating stratified charge brake control or negative pressure value tKPBKLS for initiating uniform charge brake control), and the closing control is terminated if the pressure difference DPBK becomes greater than a larger reference value (negative pressure value tKPBKO for terminating stratified charge brake control or negative pressure value tKPBKSO for terminating uniform charge brake control). In other words, the reference value has a hysteresis. This prevents hunting caused by the pressure difference DPBK becoming smaller than the reference value and then equal to or greater than the reference value in a repetitive manner. Repetitive execution and non-execution of the closing control does not take place.

Although the opening area of the intake passage is narrowed to produce negative pressure, an electronically controlled throttling mechanism that includes the throttle valve 23 and the step motor 22 is employed as a means to guarantee negative pressure. Thus, conventional devices are used to produce negative pressure. This lowers costs.

Figure 11:
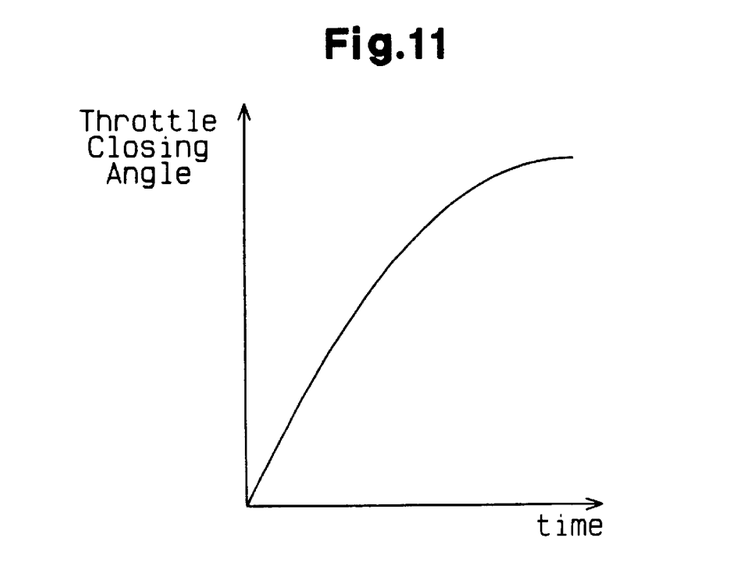
FIG. 11 is a graph showing the relationship between time and the throttle closing angle.

In this embodiment, when increasing the throttle closing angle TRTCBK, the throttle closing angle TRTCBK is renewed by adding the presently set closing angle compensation value a to the throttle closing angle TRTCBK of the previous cycle. The closing angle compensation value a is set at a large value if the pressure difference DPBK is much smaller than the negative pressure value tKPBKO for terminating stratified charge brake control. Therefore, as shown in FIG. 11, the closing speed is high immediately after the initiation of the closing control. This readily guarantees negative pressure.

If the pressure difference DPBK approaches the negative pressure value tKPBKO for terminating stratified charge brake control (if the subtracted value is small), the closing angle compensation value a is set at a small value. Thus, when a certain time elapses after starting the closing control, the closing speed decreases. This suppresses overshooting of the closing action and the negative pressure. As a result, overshooting of the closing action when negative pressure is sufficient is prevented. Accordingly, starvation of intake air is avoided. This prevents an undesirable combustion state.

Figure 8:
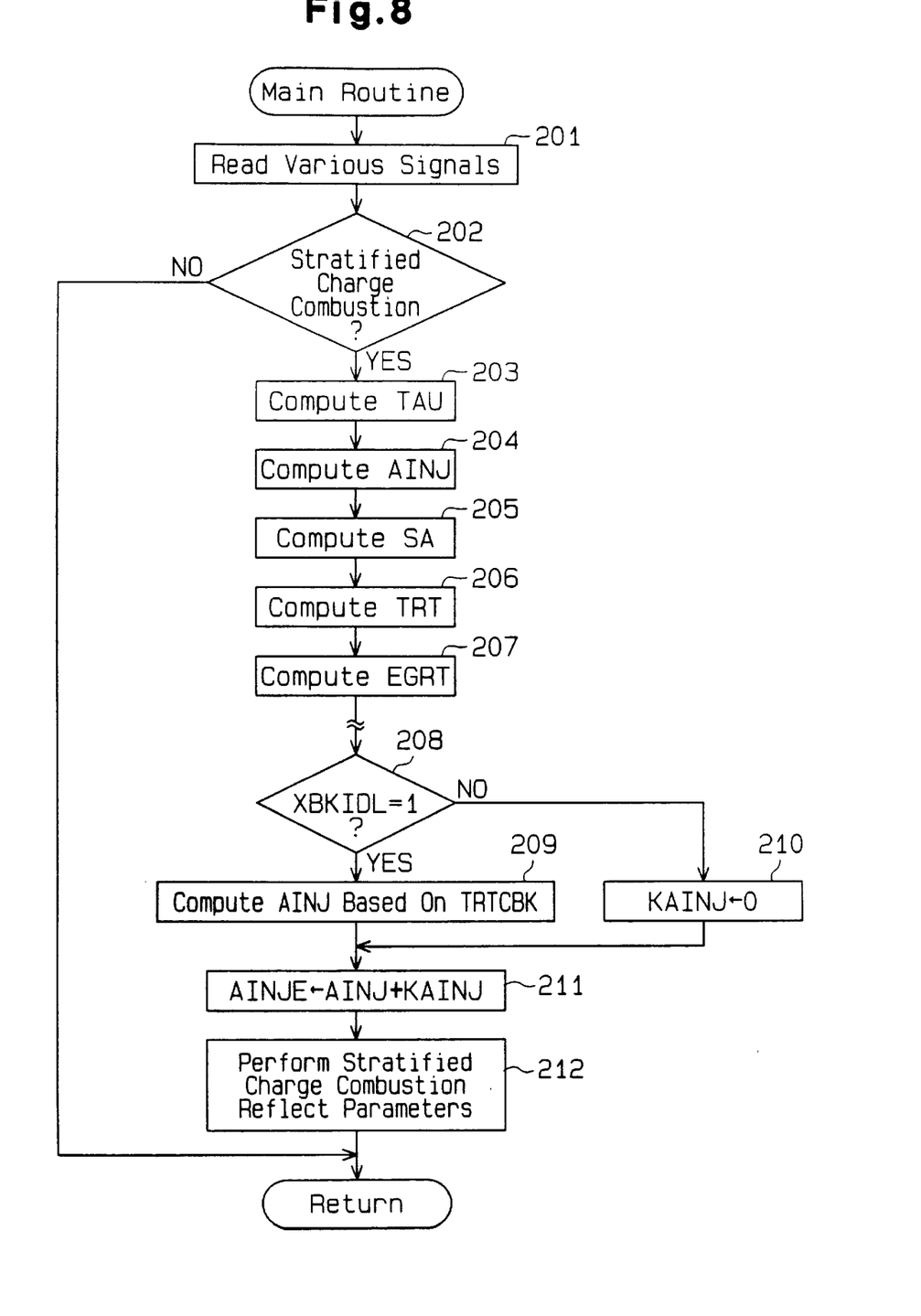
FIG. 8 is a flowchart showing a main routine executed by the ECU.

The injection timing control executed during stratified charge combustion negative pressure control (stratified charge combustion brake control) will now be described. The fuel injection control is executed to prevent the air-fuel ratio from becoming rich when performing stratified brake control. FIG. 8 shows a flowchart of a main routine of the fuel injection control executed by the ECU 30.

When entering the main routine, the ECU 30 first reads various detecting signals such as the acceleration pedal depressed amount ACCP and the engine speed NE in step 201.

In step 202, the ECU 30 determines whether stratified charge combustion is being performed. If the stratified charge combustion is not being performed, the ECU 30 temporarily terminates subsequent processing. If the stratified charge combustion is being performed, the ECU 30 proceeds to step 203 and computes the target fuel injection amount TAU.

In step 204, the ECU-30 computes the basic fuel injection timing AINJ (in relation with when the piston is located at the top dead center position). In step 205, the ECU 30 computes the target ignition timing SA. In step 206, the ECU 30 computes the basic throttle opening area TRT. In step 207, the ECU 30 computes the target EGR opening area EGRT.

Figure 9:
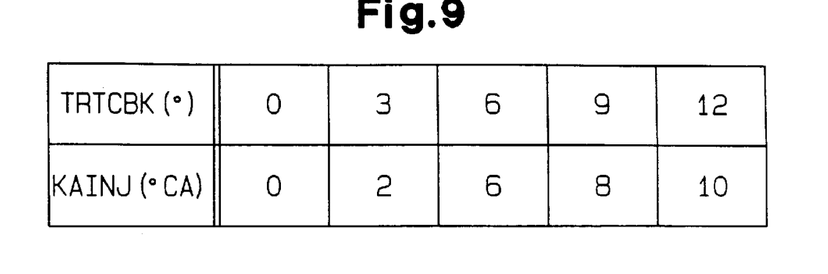
FIG. 9 is table (map) showing the relationship between the throttle closing angle and the fuel injection timing compensation angle.

After obtaining the parameters, the ECU 30 determines whether the flag XBKIDL indicating the execution of the stratified charge brake control is set at one in step 208. If the execution flag XBKIDL is set at one, the ECU 30 proceeds to step 209 and computes the fuel injection timing compensation angle KAINJ based on the present throttle closing angle TRTCBK. The ECU 30 refers to a map shown in FIG. 9 to compute the injection timing compensation angle KAINJ. In other words, if the throttle closing angle TRTCBK indicates a value of zero, the injection timing compensation angle KAINJ is set at zero. As the value of the throttle closing angle TRTCBK becomes greater, the fuel injection compensation value KAINJ is set at a larger value (toward advancement).

If the execution flag XBKIDL is not set at one but set at zero, the ECU 30 proceeds to step 210 since there is no need to compensate the injection timing. At step 210, the ECU 30 sets the injection timing compensation angle KAINJ to zero.

The ECU 30 proceeds to step 211 from either step 209 or step 210 and advances the basic injection timing AINJ by adding the injection timing compensation angle KAINJ. The obtained value is set as the final target injection timing AINJE. At step 212, the parameters are reflected in the stratified charge combustion. Subsequent processing is then temporarily terminated.

In the main routine, the closing control of the throttle valve 23 is carried out while performing stratified charge combustion if the stratified charge brake control is executed. In this case, the target injection timing AINJE is advanced from the basic injection timing AINJ by the injection timing compensation angle KAINJ. This prevents the air-fuel ratio from becoming rich.

Figure 12:
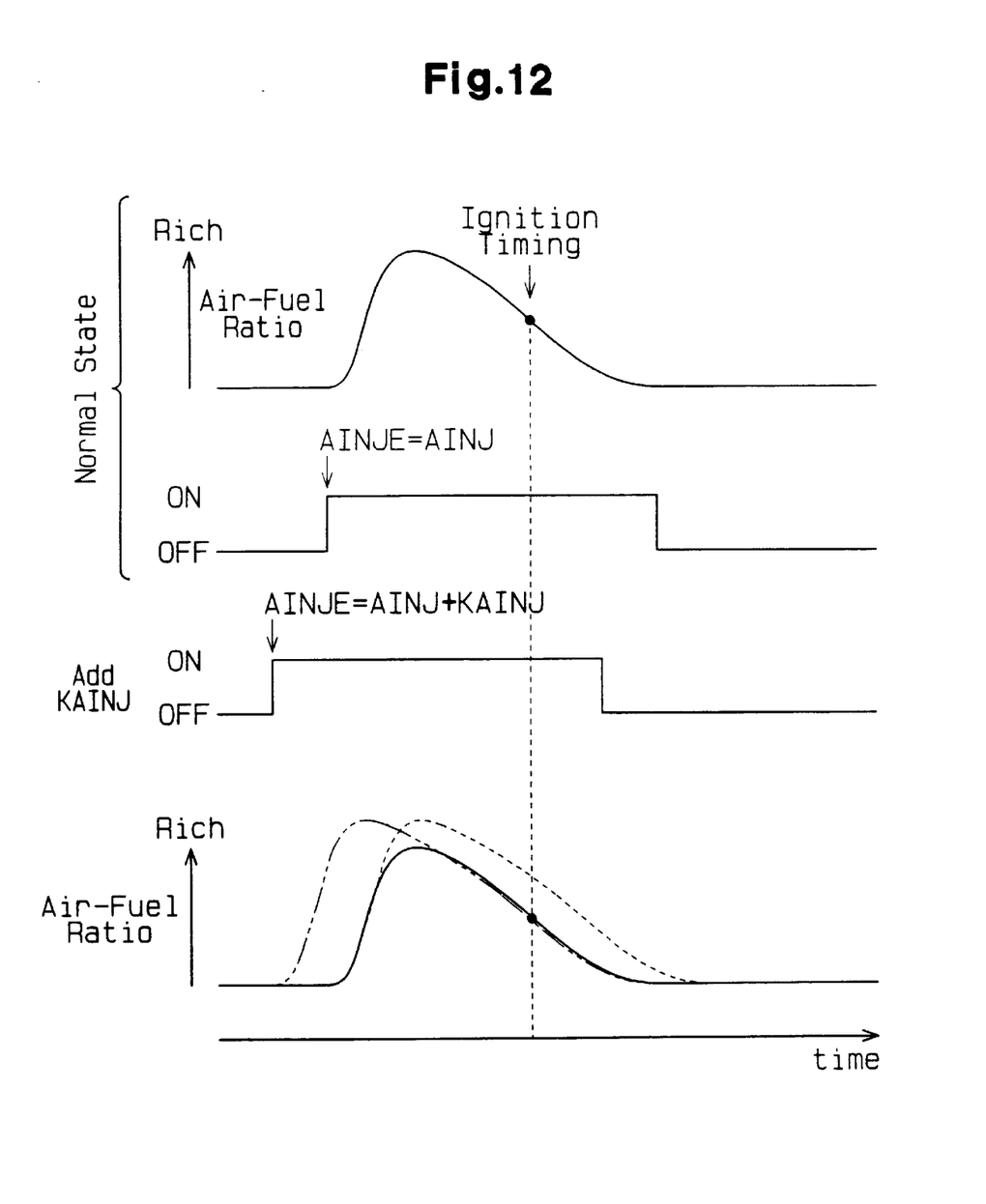
FIG. 12 is a timing chart showing the relationship between time and air-fuel ratio and between time and the fuel injection signal.

In the main routine, the closing control of the throttle valve 23 is carried out while performing stratified charge combustion during the stratified charge brake control. In this state, the closing of the throttle valve 23 causes the air-fuel ratio to become rich since the intake air amount decreases, as shown by the dotted line in FIG. 12. If normal fuel injection and ignition is performed with the air-fuel ratio in a rich state, this may result in an undesirable combustion state. However, in this embodiment, the target injection timing AINJE is advanced from the basic injection timing AINJ by the injection timing compensation angle KAINJ, as shown by the double-dotted line in FIG. 12. This guarantees the normal air-fuel ratio during ignition. As a result, the air-fuel ratio is prevented from becoming rich. This prevents an undesirable combustion state.

Although only one embodiment of the present invention has been described so far, it should be apparent to those skilled in the art that the present invention may be embodied in many other specific forms without departing from the spirit or scope of the invention. More particularly, the present invention may be modified as described below.

(1) In the illustrated embodiment, an electronically controlled throttle mechanism is used as the negative pressure producing means. The throttle mechanism includes the throttle valve 23 arranged in the intake duct 20, and the step motor 22 serving as an actuator for opening and closing the throttle valve 23. However, an idle speed control (ISC) mechanism may be used as the negative pressure producing means. Such an ISC mechanism includes an idle speed control valve arranged in an intake passage that bypasses the throttle valve 23 and an actuator for opening and closing the control valve.

The EGR mechanism 51 provided with the EGR valve 53 and other parts may also be employed as the negative pressure producing means.

Negative pressure producing mechanisms other than those shown in the drawings may also be employed. For example, a mechanical throttle valve that is linked to the acceleration pedal may be used in lieu of the electronically controlled throttle valve.

The negative pressure producing mechanism may also be constructed by combining these.

(2) In the illustrated embodiment, the computation of the closing compensation angle a enables the closing speed of the throttle valve 23 to be variable. However, the closing speed may be constant.

(3) The present invention is applied to the cylinder injection type engine 1 in the illustrated embodiment. The present invention may also be applied to an engine that performs stratified charge combustion and weak stratified charge combustion. For example, the present invention may be applied to an engine that injects fuel beneath the intake valves 6a, 6b provided in the associated intake ports 7a, 7b. The present invention may also be applied to an engine that injects fuel directly into the cylinder bores (combustion chambers 5) from injection valves arranged near the intake valves 6a, 6b. As another option, the present invention may be applied to an engine that does not perform stratified charge combustion.

(4) In the illustrated embodiment, helical type intake ports are employed to produce swirls. However, the swirls do not necessarily have to be produced. In such case, parts such as the swirl control valve 17 and the step motor 19 may be eliminated.

(5) The present invention is applied to a gasoline engine in the illustrated embodiment. However, the present invention may also be applied to other types of engines such as diesel engines.

(6) In the illustrated embodiment, the atmospheric pressure PA is detected by the intake pressure sensor 61. However, an atmospheric pressure sensor may be provided to detect the atmospheric pressure.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling brake force of a vehicle movable based on rotation of an engine, said apparatus comprising:

a brake booster for increasing said brake force in accordance with negative pressure applied thereto, means for generating the negative pressure that is supplied to the brake booster;

means for sensing an amount based on the negative pressure supplied to the brake booster;

means for determining that an amount of the negative pressure is smaller than a predetermined amount;

means for actuating the generating means to increase the amount of the negative pressure when the determining means determines that the negative pressure is smaller than the predetermined amount;

means for computing the amount of the negative pressure required to operate the brake booster, said computing means computing the required amount of the negative pressure based on a difference between the predetermined amount and the sensed amount; and means for correcting the amount of the negative pressure increased by the actuating means based on the computed amount.

2. The apparatus as set forth in claim 1, wherein said correcting means variably correcting the amount of the negative pressure.

3. The apparatus as set forth in claim 2, wherein said correcting means includes memory means that stores variable correct value for correcting the magnitude of the negative pressure, said correct value increasing in proportion with the difference between the predetermined magnitude and the sensed magnitude.

4. The apparatus as set forth in claim 3 further comprising:

an air intake passage for supplying air to the engine;

said generating means including a throttle valve disposed in the air intake passage, said throttle valve being rotated in opposite directions selectively with a variable speed to be open and closed, wherein said throttle valve is closed to generate the negative pressure; and said correct value increasing to increase the speed of rotation of the throttle valve.

5. The apparatus as set forth in claim 4, wherein said sensing means includes:

a first sensor for detecting the negative pressure acting within the brake booster;

a second sensor for detecting air pressure acting on an outer surface of the brake booster; and a second computing means for computing a difference between the negative pressure detected by the first sensor and the air pressure detected by the second sensor.

6. The apparatus as set forth in claim 5, wherein said first computing means computes a target opening angle of the throttle valve based on driving state of the engine, and wherein said first computing means computes a rotating angle to close the throttle valve.

7. An apparatus for controlling brake force of a vehicle movable based on rotation of an engine, said engine having a combustion chamber that receives fuel from a fuel injector and air from an air intake passage through a throttle valve that adjust amount of air flowing to the engine, wherein said air and fuel are mixed and combusted in the combustion chamber, wherein said engine is operated selectively with a stratified charge combustion mode and a uniform charge combustion mode, and wherein said stratified charge combustion mode is selected to increase the amount of the air and the fuel supplied to the engine and improve a combusting state of the engine, said apparatus comprising:

- a brake booster for increasing said brake force in accordance with negative pressure applied thereto, said brake booster being actuated by the negative pressure greater than a predetermined magnitude;
- said throttle valve being closed to generate the negative pressure that is supplied to the brake booster;
- means for sensing a magnitude based on the negative pressure supplied to the brake booster;
- means for determining an absolute magnitude of the negative pressure that is smaller than the predetermined value;
- means for actuating the generating means to increase the absolute magnitude negative pressure when the determining means determines that the negative pressure is smaller than the predetermined magnitude;
- means for computing the magnitude of the negative pressure required to operate the brake booster, said computing means computing the required magnitude of the negative pressure based on a difference between the predetermined magnitude and the sensed magnitude;
- means for variably correcting the magnitude of the negative pressure increased by the actuating means based on the computed magnitude; and
- said correcting means including memory means that stores variable correct value for correcting the magnitude of the negative pressure, said correct value increasing in proportion with the difference between the predetermined magnitude and the sensed magnitude.

8. The apparatus as set forth in claim 7, wherein said sensing means includes;

- a first sensor for detecting the negative pressure acting within the brake booster;
- a second sensor for detecting air pressure acting on an outer surface of the brake booster; and
- a second computing means for computing a difference between the negative pressure detected by the first sensor and the air pressure detected by the second sensor.

9. The apparatus as set forth in claim 8, wherein said first computing means computes a target opening angle of the throttle valve based on driving state of the engine, and wherein said first computing means computes a rotating angle to close the throttle valve.

* * * * *